US 8,878,490 B2
Nov. 4, 2014

(12) United States Patent
LaSota et al.

(10) Patent No.: US 8,878,490 B2
(45) Date of Patent: Nov. 4, 2014

(54) TWIST ON BATTERY PACK (71) Applicant: Milwaukee Electric Tool Corporation, Brookfield, WI (US)

(72) Inventors: Richard J. LaSota, Pewaukee, WI (US); Samuel Sheeks, Brookfield, WI (US); Paul Rossetto, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 14 days.

(21) Appl. No.: 13/888,987

(22) Filed: May 7, 2013

(65) Prior Publication Data
US 2013/0294019 A1   Nov. 7, 2013

Related U.S. Application Data (60) Provisional application No. 61/643,414, filed on May 7, 2012.

(51) Int. Cl.
H02J 7/00 (2006.01)

(52) U.S. Cl.
CPC .................. H02J 7/0045 (2013.01)
USPC .......................... 320/114; 320/107

(58) Field of Classification Search
USPC ........................................... 13/114
See application file for complete search history.

(56) References Cited

U.S. PATENT DOCUMENTS

| | | |
|---|---|---|
| 1,332,379 A | 3/1920 | Bramming |
| 3,089,072 A | 5/1963 | Jephcott |
| 3,533,119 A | 10/1970 | Dokos |
| 4,249,057 A | 2/1981 | Schlegel et al. |
| 4,405,890 A * | 9/1983 | Hicks, Jr. ...................... 320/114 |
| 4,644,244 A | 2/1987 | Kittelson |
| 4,751,452 A | 6/1988 | Kilmer et al. |
| 5,122,427 A | 6/1992 | Flowers et al. |
| 5,368,954 A | 11/1994 | Bruns |
| 5,445,900 A | 8/1995 | Miller, Jr. et al. |
| 5,476,729 A | 12/1995 | Miller, Jr. et al. |
| 6,139,359 A | 10/2000 | Fuhreck et al. |
| 6,296,368 B1 * | 10/2001 | Maglica et al. ............... 362/183 |
| 7,121,362 B2 | 10/2006 | Hsu et al. |
| 7,186,117 B2 | 3/2007 | Chen |
| 7,205,745 B2 | 4/2007 | Murashige et al. |
| 7,619,387 B2 | 11/2009 | Amend et al. |
| 7,709,136 B2 | 5/2010 | Touchton et al. |
| 7,782,223 B2 * | 8/2010 | Lang et al. ............... 340/815.45 |
| 8,695,725 B2 * | 4/2014 | Lau et al. ....................... 173/170 |
| 2004/0081883 A1 | 4/2004 | Mooty et al. |
| 2006/0228936 A1 * | 10/2006 | Chen ............................ 439/500 |
| 2008/0020269 A1 | 1/2008 | Scherzer |
| 2008/0305387 A1 | 12/2008 | Murray et al. |
| 2010/0190052 A1 | 7/2010 | Rajani et al. |
| 2010/0209752 A1 | 8/2010 | Lerner et al. |
| 2011/0036606 A1 * | 2/2011 | Young et al. ................... 173/104 |

FOREIGN PATENT DOCUMENTS

JP       01171782       7/1989

OTHER PUBLICATIONS

International Search Report and Written Opinion for Application No. PCT/US2013/039929 dated Aug. 27, 2013 (12 pages).
Milwaukee Electric Tool Corporation, Operator's Manual Cat. No. 0490-20, 58-14-0490d4, 20 pages.
Milwaukee Electric Tool Corporation, Service Parts List Catalog No. 0490-20, 54-42-0491, 2 pages.

* cited by examiner

*Primary Examiner* — Arun Williams
(74) *Attorney, Agent, or Firm* — Michael Best & Friedrich LLP (57) ABSTRACT A power tool powered by a battery having a guide post, a first battery terminal, a second battery terminal, and a third battery terminal. The power tool including a battery interface for electrically interfacing with the battery and a battery receptacle for receiving the battery. The battery interface including a first electrical terminal, a second electrical terminal, and a third electrical terminal. The battery receptacle including a channel for receiving the guide post, the channel having a first portion, a second portion connected to the first portion by a first elbow, and a third portion connected to the second portion by a second elbow. Wherein the guide post travels through the first portion to the second portion, and through the second portion to the third portion in order to secure the battery within the battery receptacle.

19 Claims, 8 Drawing Sheets

TWIST ON BATTERY PACK

CROSS-REFERENCE TO RELATED APPLICATIONS

The present application claims priority to U.S. Provisional Patent Application Ser. No. 61/643,414, filed May 7, 2012, the entire contents of which are incorporated herein by reference.

BACKGROUND

The present invention relates to a tool including a rechargeable battery pack for powering the tool.

Tools (e.g. a power drill, saw, grinder, etc.), flashlights, or radios can be powered by battery packs, which are inserted into a battery receptacle of the tool or flashlight.

SUMMARY

In one embodiment, the invention provides a power tool powered by a battery having a guide post, a first battery terminal, a second battery terminal, and a third battery terminal. The power tool comprising a battery interface for electrically interfacing with the battery and a battery receptacle for receiving the battery. The battery interface including a first electrical terminal, a second electrical terminal, and a third electrical terminal. The battery receptacle including a channel for receiving the guide post, the channel having a first portion, a second portion connected to the first portion by a first elbow, and a third portion connected to the second portion by a second elbow. Wherein the guide post travels through the first portion to the second portion, and through the second portion to the third portion in order to secure the battery within the battery receptacle.

In another embodiment, the invention provides a power tool powered by a battery having a guide post, a first battery terminal, a second battery terminal, and a third battery terminal. The power tool comprising a battery interface for electrically interfacing with the battery and a battery receptacle for receiving the battery. The battery interface including a first electrical terminal, a second electrical terminal, and a third electrical terminal. The battery receptacle including a channel for receiving the guide post, the channel having a first portion, a second portion, and a third portion. Wherein, when the guide post is in the first portion, the first electrical terminal is spaced apart from the first battery terminal, the second electrical terminal is spaced apart from the second battery terminal, and the third electrical terminal is spaced apart from the third battery terminal. Wherein, when the guide post is in the second portion, the first electrical terminal is connected to the first battery terminal, the second electrical terminal is connected to the second battery terminal, and the third electrical terminal is spaced apart from the third battery terminal. Wherein, when the guide post is in the third portion, the first electrical terminal is connected to the first battery terminal, the second electrical terminal is connected to the second battery terminal, and the third electrical terminal is connected to the third battery terminal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
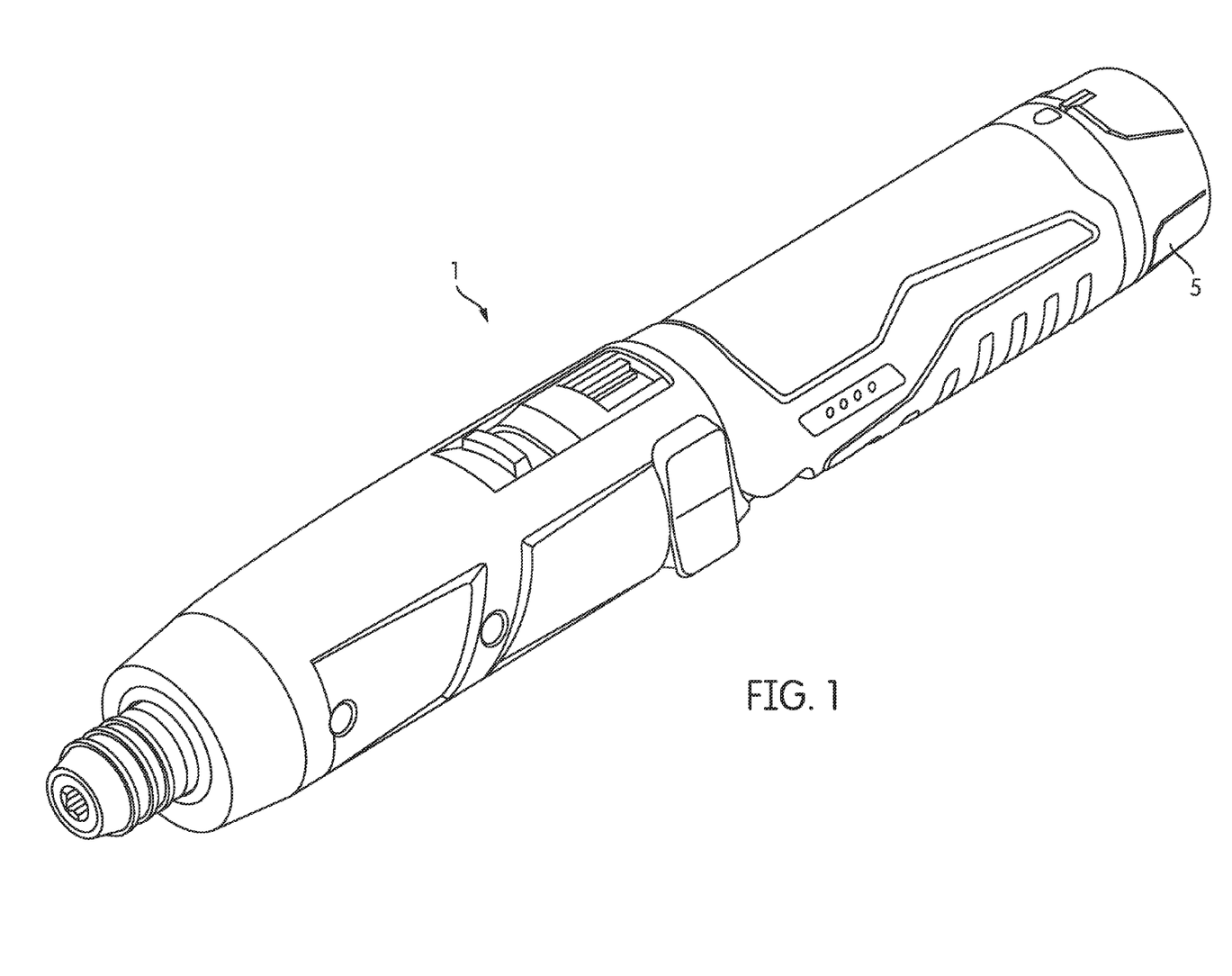
FIG. 1 is a perspective view of a tool.
Figure 6:
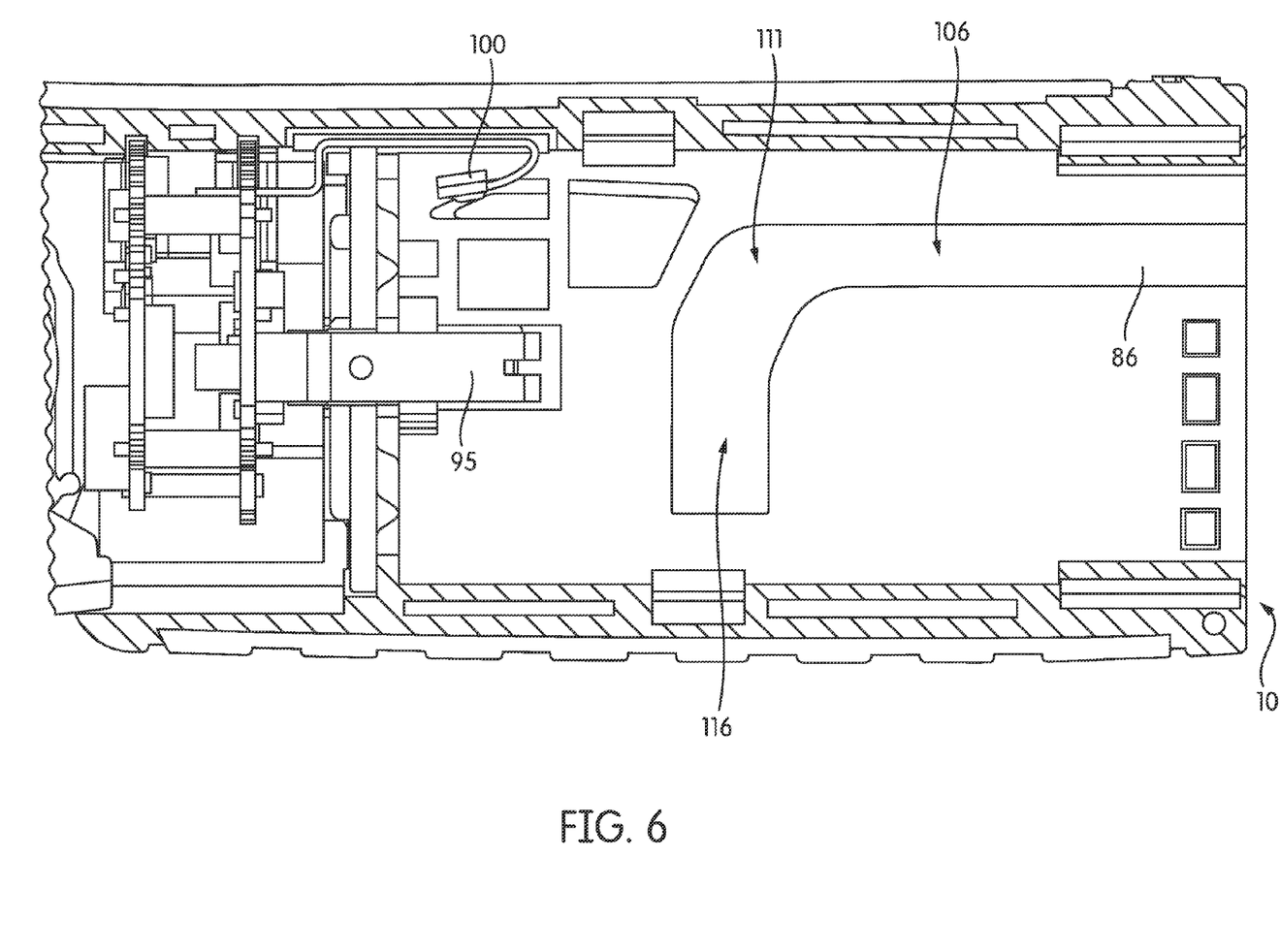
FIG. 6 is a sectional view of the drill illustrating a battery receptacle.
Figure 7:
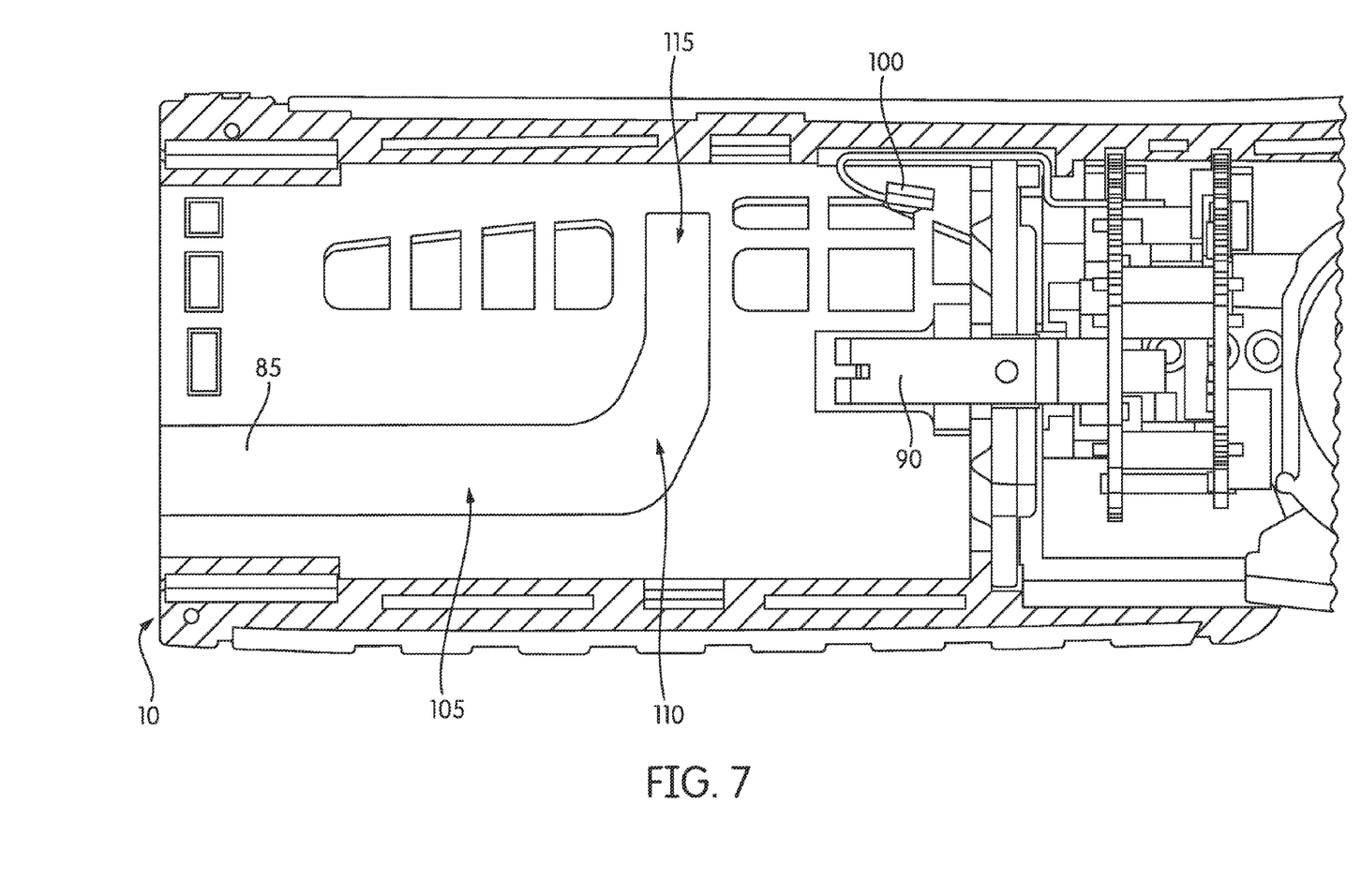
FIG. 7 is a sectional view of the drill illustrating the battery receptacle.

FIG. 1 is a perspective view of a device or a tool 1. The tool 1 can be a power tool (e.g. a power drill, saw, grinder, etc.), a flashlight, a radio, any other tool which receives electric power from a battery, or any other device which receives electric power from a battery. The tool 1 includes a battery pack 5 and a battery receptacle 10 (FIGS. 6 and 7). The battery pack 5 provides DC power to the tool 1. The battery pack 5 is placed within the battery receptacle 10.

Figure 2:
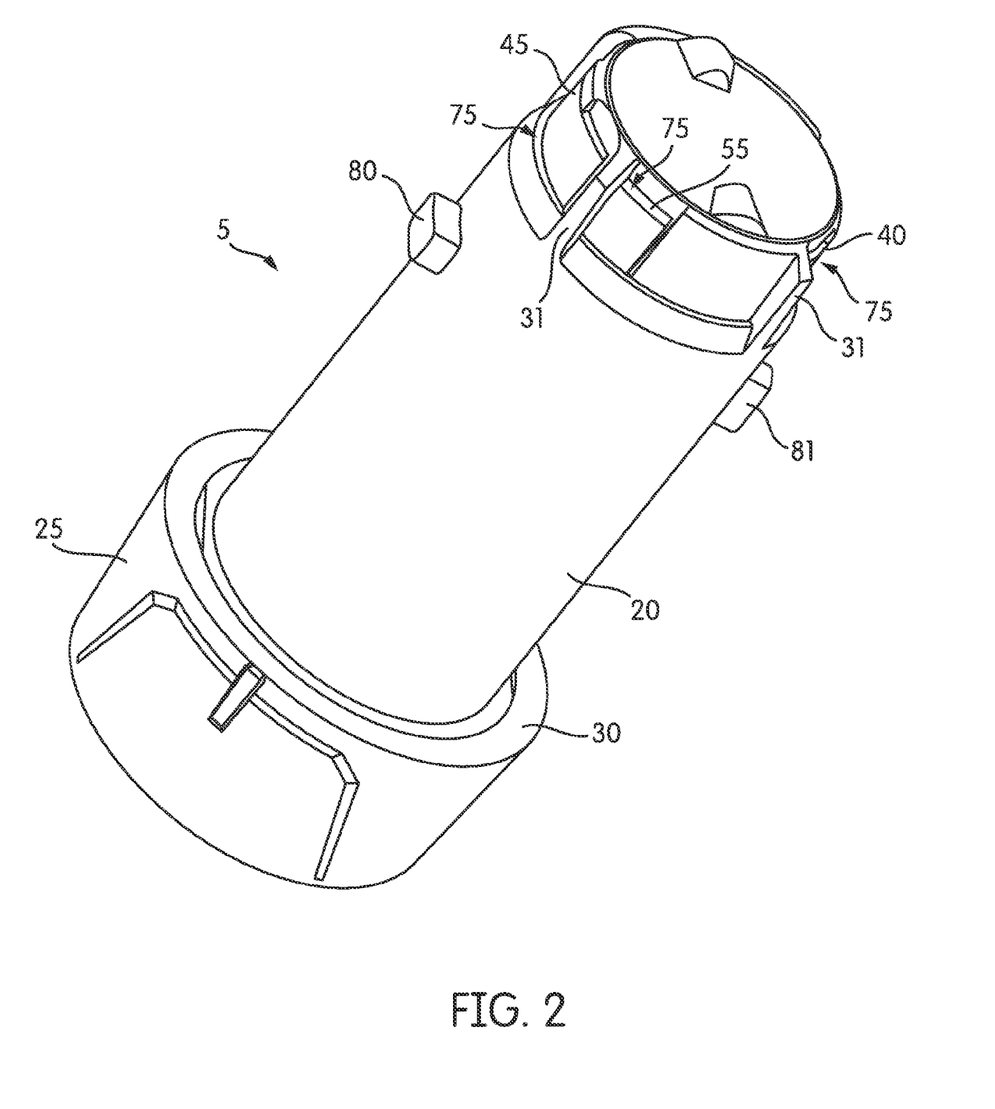
FIG. 2 is a perspective view of a battery pack of the tool.
Figure 3:
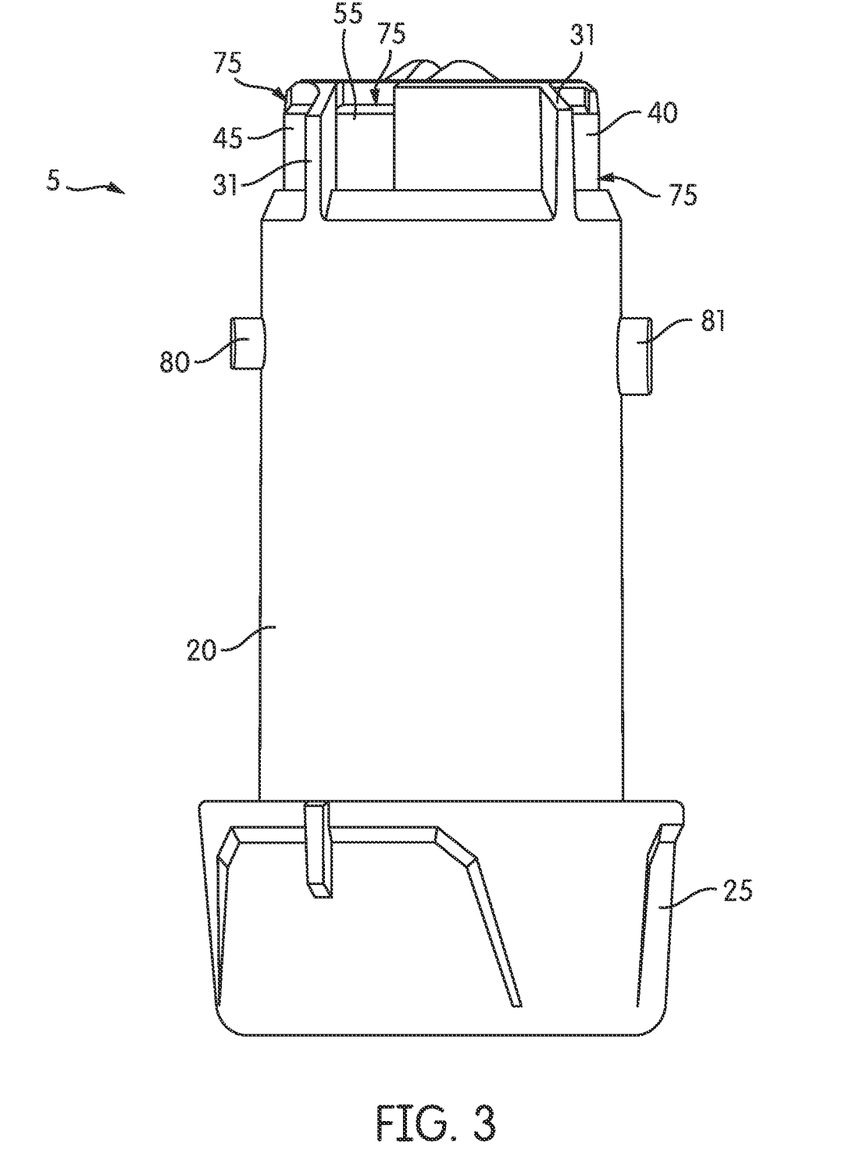
FIG. 3 is a front view of the battery pack of the tool.
Figure 4:
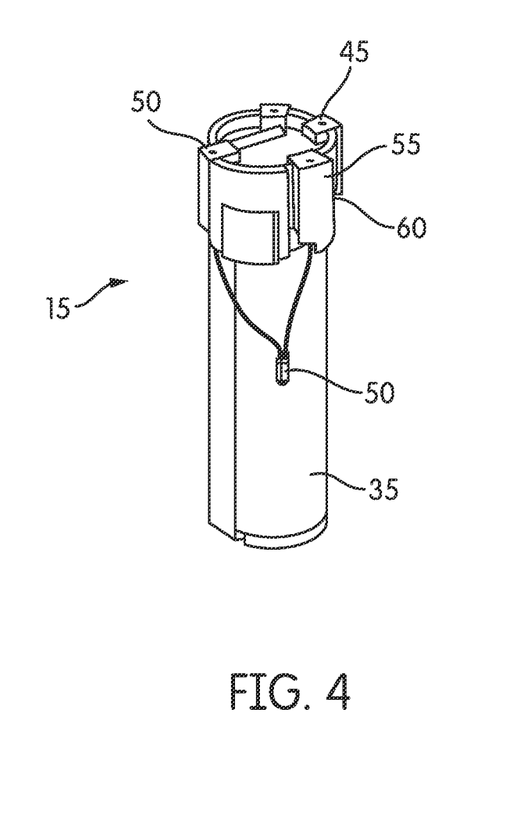
FIG. 4 is a perspective view of a battery sub-assembly.

FIGS. 2 and 3 illustrate the battery pack 5. The battery pack 5 includes a battery sub-assembly 15 (FIG. 4), a housing 20, a bottom cap 25, and a gasket 30. The battery sub-assembly 15 is contained within the housing 20 and secured in place by the bottom cap 25. The housing 20 and bottom cap 25 are composed of plastic or a similar material, but may be made of other materials in another embodiment. The housing 20 further includes ribs 31. As shown in FIG. 4, the battery sub-assembly 15 includes a battery cell 35, a positive terminal 40, a negative terminal 45, a thermistor 50, a thermistor terminal 55, and a terminal support 60.

Figure 5:
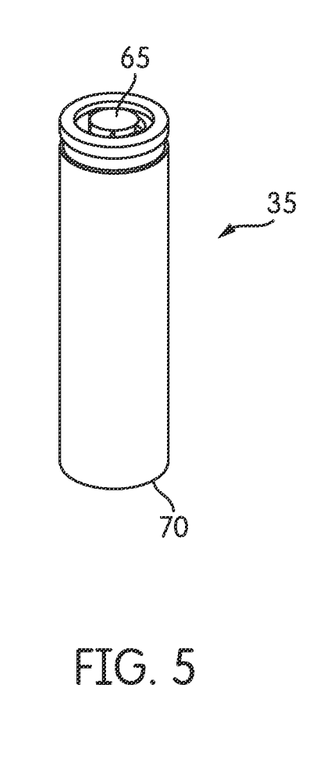
FIG. 5 is a perspective view of a battery cell of the battery sub-assembly.

As shown in FIG. 5 the battery cell 35 includes a positive output 65 and a negative output 70. The battery cell 35 is an electromechanical battery cell. In one embodiment the battery cell 35 is a rechargeable battery, such as, NiCD, NiMH, Lithium-ion, Lithium-ion polymer, or any other kind of rechargeable battery. In another embodiment the battery cell 35 is a non-rechargeable battery. As shown in FIG. 4 the positive terminal 40 is electrically connected to the positive output 65 of the battery cell 35. The negative terminal 45 is electrically connected to the negative output 70 of the battery cell 35.

The thermistor 50 is electrically connected to the negative terminal 45 and the thermistor terminal 55. The thermistor 50 is a temperature sensor that monitors the temperature of the battery cell 35. The monitored temperature of the battery cell 35 is communicated to the tool 1 or a battery charger. The communicated temperature provides an indication that the battery cell 35 is either properly or improperly functioning. When the battery pack 5 is fully secured within the battery receptacle 10 the monitored temperature of the battery cell 35 is communicated to the tool 1. If the communicated temperature is too high, battery cell 35 may be improperly functioning and the tool 1 will not operate. If the thermistor 50 provides a false temperature reading, the battery cell 35 may be improperly functioning and the tool 1 will not operate. When the battery pack 5 is charging, via a battery charger, the communicated temperature provides an indication of the charge condition of the battery cell 35 in order to determine charge current levels. Further, if the thermistor 50 provides a false reading during charging, the battery charger will not charge the battery cell 35.

The terminal support 60 is placed on the positive output 65 side of the battery cell 35. The terminal support 60 holds the positive terminal 40, negative terminal 45, and thermistor terminal 55, in place. The battery sub-assembly 15 is placed within the housing 20 so the positive terminal 40, negative terminal 45, and thermistor terminal are aligned with apertures 75 in the housing 20. The bottom cap 25 is coupled to the bottom of the housing 20 to secure the battery sub-assembly 15 within.

The housing 20 further includes guide posts 80 and 81. The guide posts 80 and 81 are used to guide the battery pack 5 into the battery receptacle 10. In the embodiment shown the guide posts 80 and 81 have a different height and length.

FIGS. 6 and 7 are sectional views of the battery receptacle 10. The battery receptacle 10 includes one or more channels 85 and 86, a positive tool terminal 90, a negative tool terminal 95, and a thermistor tool terminal 100. The channels 85 and 86 include straight vertical portions 105 and 106, angled portions 110 and 111, and straight horizontal portions 115 and 116. The channels 85 and 86 have different widths to receive the different guide posts 80 and 81. This prevents the battery pack 5 from being inserted into the battery receptacle 10 in an incorrect manner. In another embodiment, the tool 1 includes three or more pairs of guide posts and channels. In another embodiment, the channels 85 and 86 includes four or more portions.

When the battery pack 5 is fully-inserted into the battery receptacle 10, the positive tool terminal 90 is electrically connected to the positive terminal 40, the negative tool terminal 95 is electrically connected to the negative terminal 45, and the thermistor tool terminal 100 is electrically connected to the thermistor terminal 55.

Figure 8:
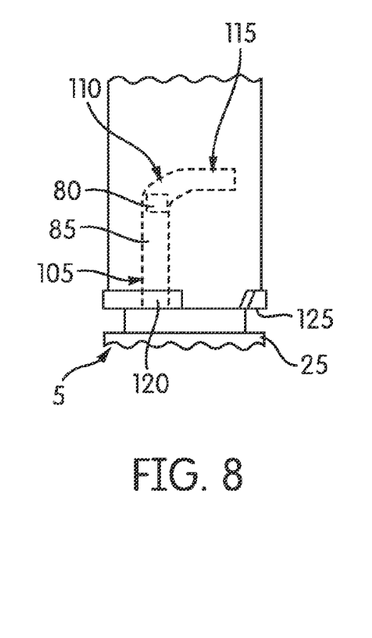
FIG. 8 is a phantom view of the battery receptacle illustrating the battery pack being inserted into the battery receptacle.
Figure 9:
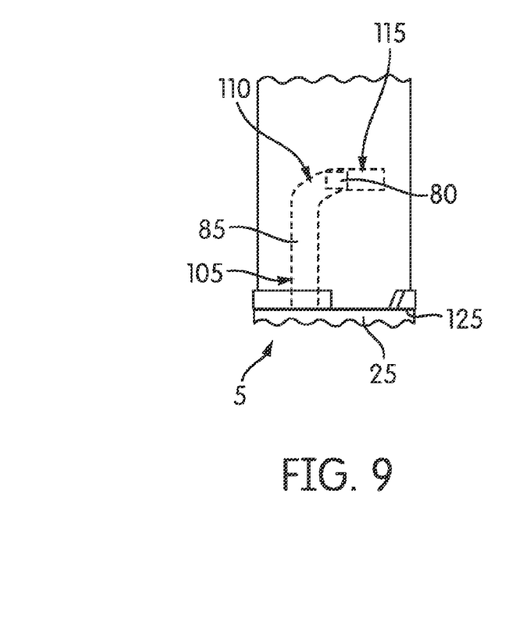
FIG. 9 is a phantom view of the battery receptacle illustrating the battery pack being inserted into the battery receptacle.
Figure 10:
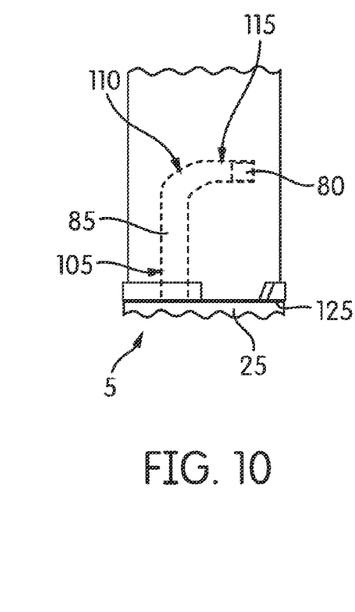
FIG. 10 is a phantom view of the battery receptacle illustrating the battery pack being inserted into the battery receptacle.

FIGS. 8, 9, and 10 illustrates the battery pack 5 at different points of insertion into the battery receptacle 10. For illustrative purposes, only guide post 80 and channel 85 is shown, however, guide post 81 and channel 86 operate in a similar manner as guide post 80 and channel 85.

As shown in FIG. 8, in operation, a user inserts the battery pack 5 into the battery receptacle 10 by lining up the guide post 80 with the channel opening 120 of the channel 85. The guide post 80 follows the straight vertical portion 105 of the channel 85 as the battery pack 5 is inserted into the battery receptacle 10.

As shown in FIG. 9, once the guide post 80 enters the angled portion 110 of the channel 80, the user begins turning the battery pack 5 approximately twenty-five to thirty degrees. As the guide post 80 travels through the angled portion 110 of the channel 85, the gasket 30 is compressed between the bottom portion 125 of the battery receptacle 10 and the top portion of the bottom cap 25 of the battery pack 5.

As shown in FIG. 10, the guide post 80 then enters the straight horizontal portion 115 of the channel 85. The user will then turn the battery pack 5 approximately thirty to thirty-five degrees to fully lock the battery pack 5 into the battery receptacle 10. Once the battery pack 5 is fully locked into the battery receptacle 10, the gasket 30 forms a water tight seal between the battery pack 5 and the tool 1.

Figure 11:
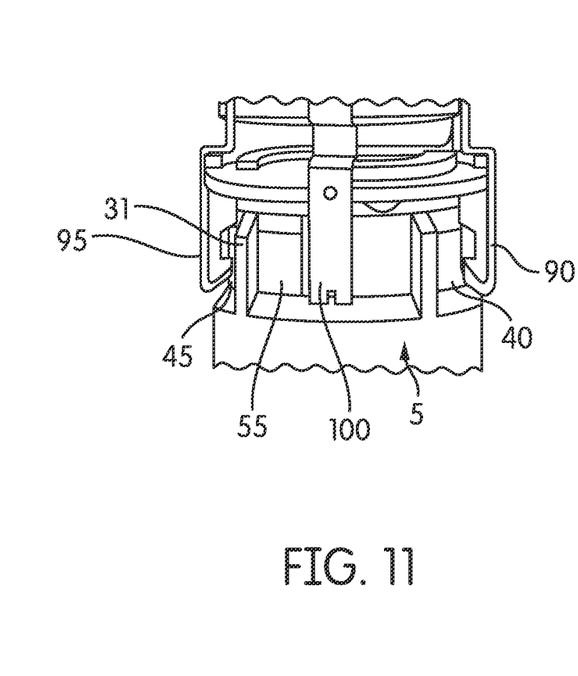
FIG. 11 illustrates the interaction of terminals of the battery receptacle with terminals of the battery pack during insertion of the battery pack into the battery receptacle.
Figure 12:
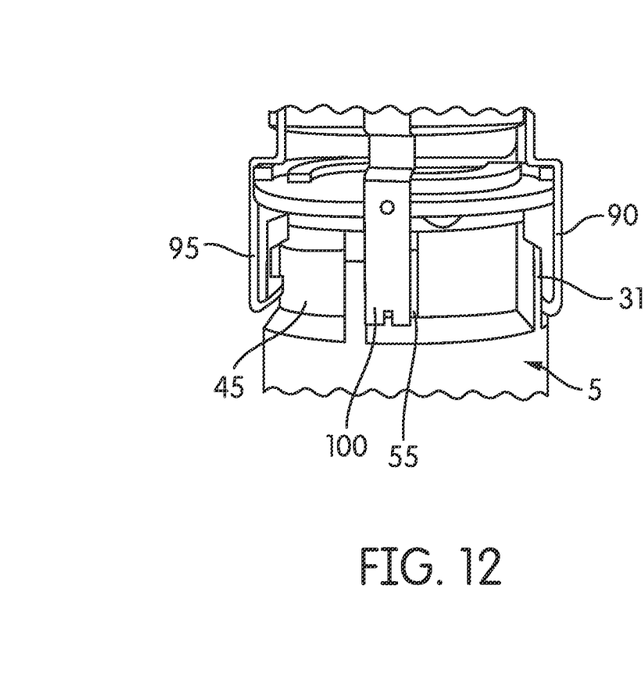
FIG. 12 illustrates the interaction of terminals of the battery receptacle with terminals of the battery pack during insertion of the battery pack into the battery receptacle.

FIGS. 11 and 12 illustrate the interaction of the battery receptacle 10 terminals and the battery pack 5 terminals. As the guide posts 80 and 81 enter the different portions of the channels 85 and 86, the terminals of the battery pack 5 connect with the terminals of the battery receptacle 10. As shown in FIG. 11, as the guide posts 80 and 81 begin to enter the angled portions 110 and 111 of the channels 85 and 86, the positive terminal 40 contacts with the positive tool terminal 90 while the negative terminal 45 contacts with the negative tool terminal 95. Once the positive and negative terminal pairs are in contact, power is supplied to the tool 1 and the tool 1 is able to be powered on. However the control circuit of the tool 1, does not allow the tool 1 to operate.

As shown in FIG. 12, once the guide posts 80 and 81 enter the straight horizontal portions 115 and 116 of the channels 85 and 86, the thermistor terminal 55 contacts with the thermistor tool terminal 100. The ribs 31 of the battery pack 5 prevent potential cross contact between the terminals.

Once all three terminal pairs are in contact the control circuit of the tool 1 allows the tool 1 to be operated. Disallowing operation of the tool 1 until all three terminal pairs are connected ensures that the battery pack 5 is fully locked into place within the battery receptacle 10 before the tool 1 can be operated.

Thus, the invention provides, among other things, a tool including a battery pack. Various features and advantages of the invention are set forth in the following claims.

What is claimed is:

1. A power tool powered by a battery having a guide post, a first battery terminal, a second battery terminal, and a third battery terminal, the power tool comprising:
   a battery interface for electrically interfacing with the battery, the battery interface including
      a first electrical terminal,
      a second electrical terminal, and
      a third electrical terminal; and
   a battery receptacle for receiving the battery, the battery receptacle including
      a channel for receiving the guide post, the channel having
         a first portion,
         a second portion connected to the first portion by a first elbow, and
         a third portion connected to the second portion by a second elbow,
      wherein the guide post travels through the first portion to the second portion, and through the second portion to the third portion in order to secure the battery within the battery receptacle;
   wherein, when the guide post is in the second portion, the first electrical terminal is connected to the first battery terminal, the second electrical terminal is connected to the second battery terminal, and the third electrical terminal is spaced apart from the third battery terminal.

2. The power tool of claim 1, wherein, when the guide post is in the first portion, the first electrical terminal is spaced apart from the first battery terminal, the second electrical terminal is spaced apart from the second battery terminal, and the third electrical terminal is spaced apart from the third battery terminal.

3. The power tool of claim 1, wherein, when the guide post is in the third portion, the first electrical terminal is connected to the first battery terminal, the second electrical terminal is connected to the second battery terminal, and the third electrical terminal is connected to the third battery terminal.

4. The power tool of claim 1, wherein the first electrical terminal is a positive terminal, the second electrical terminal is a negative terminal, and the third electrical terminal is a sensor terminal.

5. The power tool of claim 4, wherein the sensor terminal is a thermistor terminal.

6. The power tool of claim 1, wherein the power tool is inoperable when the guide post is positioned in the first portion and when the guide post is positioned in the second portion.

7. The power tool of claim 1, wherein the battery receptacle further includes a second channel for receiving a second guide post of the battery.

8. The power tool of claim 1, wherein the battery further includes a gasket that forms a seal between the battery and the power tool.

9. The power tool of claim 1, wherein the first portion is a vertical portion, the second portion is an angled portion, and the third portion is a horizontal portion.

10. The power tool of claim 1, wherein the first portion is substantially perpendicular to the third portion.

11. The power tool of claim 10, wherein the first portion and the third portion are connected by the second portion.

12. A power tool powered by a battery having a guide post, a first battery terminal, a second battery terminal, and a third battery terminal, the power tool comprising:
    a battery interface for electrically interfacing with the battery, the battery interface including
        a first electrical terminal,
        a second electrical terminal, and
        a third electrical terminal; and
    a battery receptacle for receiving the battery, the battery receptacle including
        a channel for receiving the guide post, the channel having
            a first portion,
            a second portion, and
            a third portion,
    wherein, when the guide post is in the first portion, the first electrical terminal is spaced apart from the first battery terminal, the second electrical terminal is spaced apart from the second battery terminal, and the third electrical terminal is spaced apart from the third battery terminal,
    wherein, when the guide post is in the second portion, the first electrical terminal is connected to the first battery terminal, the second electrical terminal is connected to the second battery terminal, and the third electrical terminal is spaced apart from the third battery terminal, and
    wherein, when the guide post is in the third portion, the first electrical terminal is connected to the first battery terminal, the second electrical terminal is connected to the second battery terminal, and the third electrical terminal is connected to the third battery terminal.

13. The power tool of claim 12, wherein the first electrical terminal is a positive terminal, the second electrical terminal is a negative terminal, and the third electrical terminal is a sensor terminal.

14. The power tool of claim 13, wherein the sensor terminal is a thermistor terminal.

15. The power tool of claim 12, wherein the power tool is inoperable when the guide post is positioned in the first portion and when the guide post is positioned in the second portion.

16. The power tool of claim 12, wherein the battery receptacle further includes a second channel for receiving a second guide post of the battery.

17. The power tool of claim 12, wherein the first portion is a vertical portion, the second portion is an angled portion, and the third portion is a horizontal portion.

18. The power tool of claim 12, wherein the first portion is substantially perpendicular to the third portion.

19. The power tool of claim 18, wherein the first portion and the third portion are connected by the second portion.

\* \* \* \* \*